United States Patent
Surampudi

(10) Patent No.: US 7,182,710 B2
(45) Date of Patent: Feb. 27, 2007

(54) OBSERVER-BASED CONTROL METHOD FOR AUTOMATICALLY SHIFTING A MANUAL TRANSMISSION

(75) Inventor: Bapiraju Surampudi, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 187 days.

(21) Appl. No.: 11/071,144

(22) Filed: Mar. 3, 2005

(65) Prior Publication Data

US 2005/0239595 A1  Oct. 27, 2005

(51) Int. Cl.
*B60W 10/02* (2006.01)
*B60W 10/06* (2006.01)
*B60W 10/10* (2006.01)

(52) U.S. Cl. ............... 477/77; 74/336 R; 192/3.56; 192/3.58; 192/3.63

(58) Field of Classification Search ............ 477/77, 477/79, 123, 124; 74/335, 336 R; 192/3.55
See application file for complete search history.

(56) References Cited

U.S. PATENT DOCUMENTS

| 6,295,884 B1 | 10/2001 | Miyake et al. | |
|---|---|---|---|
| 6,393,928 B1 | 5/2002 | Watanabe | |
| 6,422,104 B2 | 7/2002 | Kamiya | |
| 6,681,650 B2 * | 1/2004 | Yoshioka et al. | 74/335 |
| 6,785,599 B2 * | 8/2004 | Berger et al. | 701/51 |
| 2002/0086769 A1 * | 7/2002 | Hemmingsen et al. | 477/79 |

\* cited by examiner

*Primary Examiner*—Richard M. Lorence
*Assistant Examiner*—Edwin A. Young
(74) *Attorney, Agent, or Firm*—Gunn & Lee P.C.

(57) ABSTRACT

A method of controlling the shifting of an automatic manual transmission is based on observer-based timing of different phases of the shift process. The observer-based control strategy includes simultaneous management of the engine throttle and transmission actuators. The torque characteristics of the transmission are also taken into consideration during control of the engine throttle, thereby minimizing shift time and wear on transmission components. The control strategy uses mathematical models called observers to monitor the value of inherent properties attributable to specific actuators and to provide signals used to implement parallel task execution.

18 Claims, 3 Drawing Sheets

OBSERVER-BASED CONTROL METHOD FOR AUTOMATICALLY SHIFTING A MANUAL TRANSMISSION

BACKGROUND OF THE INVENTION

1. Technical Field

This invention relates generally to a method for automatically shifting a manual transmission, and more particularly to such a method that is applicable to synchromesh transmissions.

2. Background Art

Synchromesh transmissions are used on virtually all current models of cars equipped with manual transmissions, and are commonly found on other machines wherever the shifting of gears while moving is required. Synchromesh transmissions use friction to bring drive gears to the same speed as an output shaft before engagement. Typically, a synchronizer assembly, rotationally fixed with respect to the output shaft, is moved axially along the output shaft until it comes in frictional contact with a selected drive gear. Friction between a collar or sleeve of the synchronizer and the selected drive gear is used to synchronize the speed of the selected drive gear with the output shaft.

Several approaches have been proposed to automate the gear change process in synchromesh transmissions using actuators to provide the motive power required to move clutch and/or transmission elements. For example, U.S. Pat. No. 6,295,884 granted on Oct. 2, 2001 to Miyake, et al. for a CONTROL METHOD AND CONTROL APPARATUS FOR GEAR TRANSMISSION, describes a control methodology for synchromesh transmissions that uses a predetermined cutoff throttle to shift at a variable rate based on vehicle characteristics. The speed of change linearly increases with throttle angle. Shift speed is varied in different regimes of the gear engagement process, for example, a longer speed change during synchronization and a shorter speed time during sleeve engagement. However, Miyake, et al. does not disclose the method by which the varying times are determined.

A control device for automated synchromesh transmissions is disclosed in U.S. Pat. No.6,393,928 grated May 28, 2002 to Shinji Watanabe for a CONTROL DEVICE FOR SYNCHROMESH AUTOMATIC TRANSMISSION. The Watanabe control device senses a calibrated linear and angular position of the shift fork. The shift fork position required to achieve a selected position between every shift is learned and stored. The rate at which shift changes are made is derived empirically and is tuned/learned for optimal performance throughout the life of the transmission. The control device proposed by Watanabe requires shift position sensors and does not provide for modulation of the clutch to help speed matching.

Another device for controlling the shift process in automated synchromesh transmissions is disclosed in U.S. Pat. No. 6,422,104 granted Jul. 23, 2002 to Mitsutoshi Kamiya for an APPARATUS FOR SELECTING SELECTION GATE POSITIONS FOR CHANGE SPEED IN AUTOMATIC GEAR TRANSMISSION. Kamiya describes a mechanical and switch arrangement for the gear shift process that uses switches and interlocks for sequencing the control of the shift fork linear and rotor actuators. However, Kamiya requires a number of hard sensors and provides no means to minimize the synchronization time.

The present invention is directed to overcoming the above described problems associated with current methods for automatically shifting synchromesh transmissions. It is desirable to have a method for quickly shifting a synchromesh transmission that provides good shift feel and minimizes wear on transmission components while simultaneously minimizing drive train wind-up. It is also desirable to have a method for automatically shifting a synchromesh transmission that does not require extrinsic, supplemental, or auxiliary sensors, such as shift fork position sensors, which add cost and complexity to the transmission control system. Moreover, it is desirable to have a method for automatically shifting a synchromesh transmission that controls engine throttle during the shift process to dampen drive train oscillations and thereby reduce the length of time required for the synchronization process.

SUMMARY OF THE INVENTION

In accordance with one aspect of the present invention, an observer-based control method for automatically shifting a manual transmission on a vehicle includes monitoring an intrinsic operating parameter of a clutch actuator and determining the status of clutch engagement, or disengagement, corresponding with an observed value of the intrinsic operating parameter of the clutch actuator. At least one intrinsic operating parameter of a shift fork actuator is also monitored, and a spatial position of the shift fork that corresponds with an observed value of the intrinsic operating parameter, or parameters, of the shift fork actuator is determined.

In accordance with another aspect of the present invention, an observer-based control method for automatically shifting a manual transmission on a vehicle includes selecting a desired gear not presently connected to an output shaft of the transmission and delivering a signal to a transmission controller correlative of the selected gear. A clutch disengage command is provided to a clutch actuator system and disengagement of the clutch is initiated. During the clutch disengagement process control of the engine throttle is simultaneously assumed to reduce drive train oscillations. Disengagement of the clutch is observed and a currently engaged gear is disconnected from the output shaft. A shift fork is moved into initial contact with a synchronizer associated with the selected gear while simultaneously throttling the engine under no load. A countershaft speed control process in which friction force between the synchronizer and the selected gear is monitored and the engine throttle is simultaneously controlled to bring the selected gear and the output shaft to the same speed. The selected gear is connected to the output shaft, and engagement of the clutch is initiated. A clutch engagement process is initiated and the engine throttle is simultaneously controlled to reduce drive train oscillations during the process of engaging the clutch. Throttle control is returned to the vehicle driver in response to observing that the clutch is engaged.

Other features of the observer-based control method for automatically shifting a manual transmission include determining the influence of changes in transmission torque characteristics on drive train oscillations while engaging and disengaging the clutch and throughout the countershaft speed control process.

BRIEF DESCRIPTION OF THE DRAWINGS

A more complete understanding of the method for controlling the automatic shifting of a manual transmission, in accordance with the present invention, may be had by reference to the following detailed description when taken in conjunction with the accompanying drawings, wherein.

DETAILED DESCRIPTION OF THE INVENTION

Figure 1:
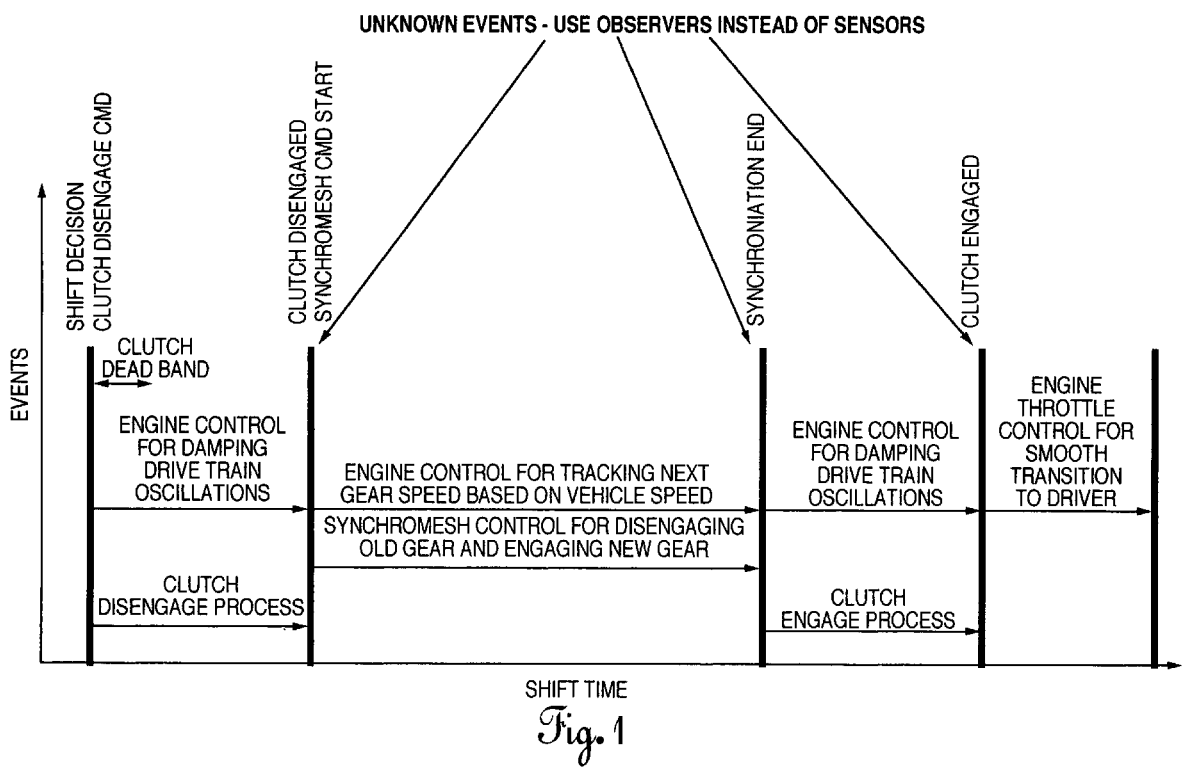
FIG. 1 is a diagram illustrating the management of engine throttle and transmission actuator events during the shift process, in accordance with the present invention.

The present invention is directed to a control strategy for shifting automatic synchromesh transmissions using the observed values of intrinsic operating parameters to control clutch engagement/disengagement and the shifting of gears by powered actuators. Intrinsic operating parameters are those parameters that represent the inherent physical properties that determine the operation of a specific actuator and are innate properties originating within the actuator. For example, in a hydraulic actuator system, the pressure of fluid acting on a force-applying member of the actuator is an intrinsic operating parameter of the actuator. Similarly, the electrical current flowing through an electrically powered actuator is an intrinsic operating parameter. Importantly, the control strategy embodying the present invention does not require extrinsic, i.e., external, hard sensors to determine the spatial position of a force-applying element of an actuator, such as an encoder or linear displacement sensor. Importantly, by avoiding the need for external actuator position sensors the added cost of such sensors, especially when incorporated in production systems, is circumvented.

Heretofore, actuator or lever displacement has been measured by appropriate hard sensors, such as encoder or linear displacement transducers mounted on, oe in close proximity to, the actuator. However, it should be noted that the displacement of a moveable member of an actuator may not be the same as the physical displacement of the contacted member. Mechanism play, component wear, and backlash all preclude a totally accurate indication of the position of the contacted member when measuring actuator displacement when based on values provided by linear displacement or encoder sensors. In accordance with the present invention, the force applied on the clutch plate or shift fork is proportional to the fluid pressure or current driving the respective actuator, and therefore. It is submitted that the force value required for a specific clutch plate displacement or synchronizer contact and engagement, as embodied in the present invention, more accurately estimates actual physical displacement.

The control strategy embodying the present invention incorporates observer-based timing for controlling events during the shift process. The term "observer" as used herein means that the different phases of the shift process are controlled, for example by an programmable electronic transmission control unit (ETCU) by observing, i.e., monitoring, an intrinsic property of the clutch and shift fork actuators along with other inherent properties, such as engine and vehicle speed.

In the control method embodying the present invention, after receipt of an initial shift command indicating a desired shift to a different gear, there is no need for additional signals from extrinsic clutch or shift fork position sensors. In the observer-based control strategy embodying the present invention the ETCU functions much like a bystander, or spectator, in that the contemporary status or position of the respective actuators is estimated based upon observed intrinsic parameters during in the shift process. Thus, the observer becomes the "eyes" and is basically predicting, in accordance with the algorithms defined below, where the actuators are physically positioned based on fluid pressure or electrical current. Pressure or current feedback values are inherently available from actuator systems and therefore there is no requirement for additional hard sensors.

An important aspect of the methodology provided by the present invention is management of the engine throttle and transmission actuators as shown in FIG. 1. FIG. 1 is a diagram of the events occurring during a shift process incorporating the present invention. As illustrated in the diagram, there are three events that are observed, i.e., not dictated by hard sensors, that provide transition to a subsequent phase of the shift process. In an initial phase after receipt of a shift decision, a clutch disengage process is observed during which the engine is controlled to dampen drive train oscillations. When it is observed that the clutch is disengaged, a synchromesh control process during which a currently engaged gear is disengaged and a selected gear is engaged, is observed while the engine is controlled under no load to synchronize the speed of the selected gear with vehicle speed prior to engagement of the selected gear with an output shaft of the transmission. When it is observed that the selected gear is engaged with the output shaft, also described below in greater detail, a clutch engagement process is observed during which the engine is simultaneously controlled under increasing load to dampen drive train oscillations during clutch engagement. Lastly, when it is observed that the clutch is engaged, the engine throttle is controlled to provide a smooth transition of throttle control to the driver.

Importantly, the wait times during the shift process are used efficiently by executing simultaneous tasks such as clutch engagement/disengagement, engine control, and shifting of gears to reduce wind-up and speed matching time. Wind-up is defined as the spring-like torsional deflection of the mechanical members between the transmission output shaft and the wheels. This approach minimizes shift time and wear on transmission components, particularly the synchronizer system. The methodology embodying the present invention uses observers, i.e., mathematical models, to estimate signals that are needed to implement the parallel task execution. For a specific vehicle, engine and transmission arrangement, the observers may be initially validated through open loop testing on a chassis dynamometer, thereby avoiding sensor cost overhead for mass production of specific vehicle/engine/transmission combinations.

Figure 2:
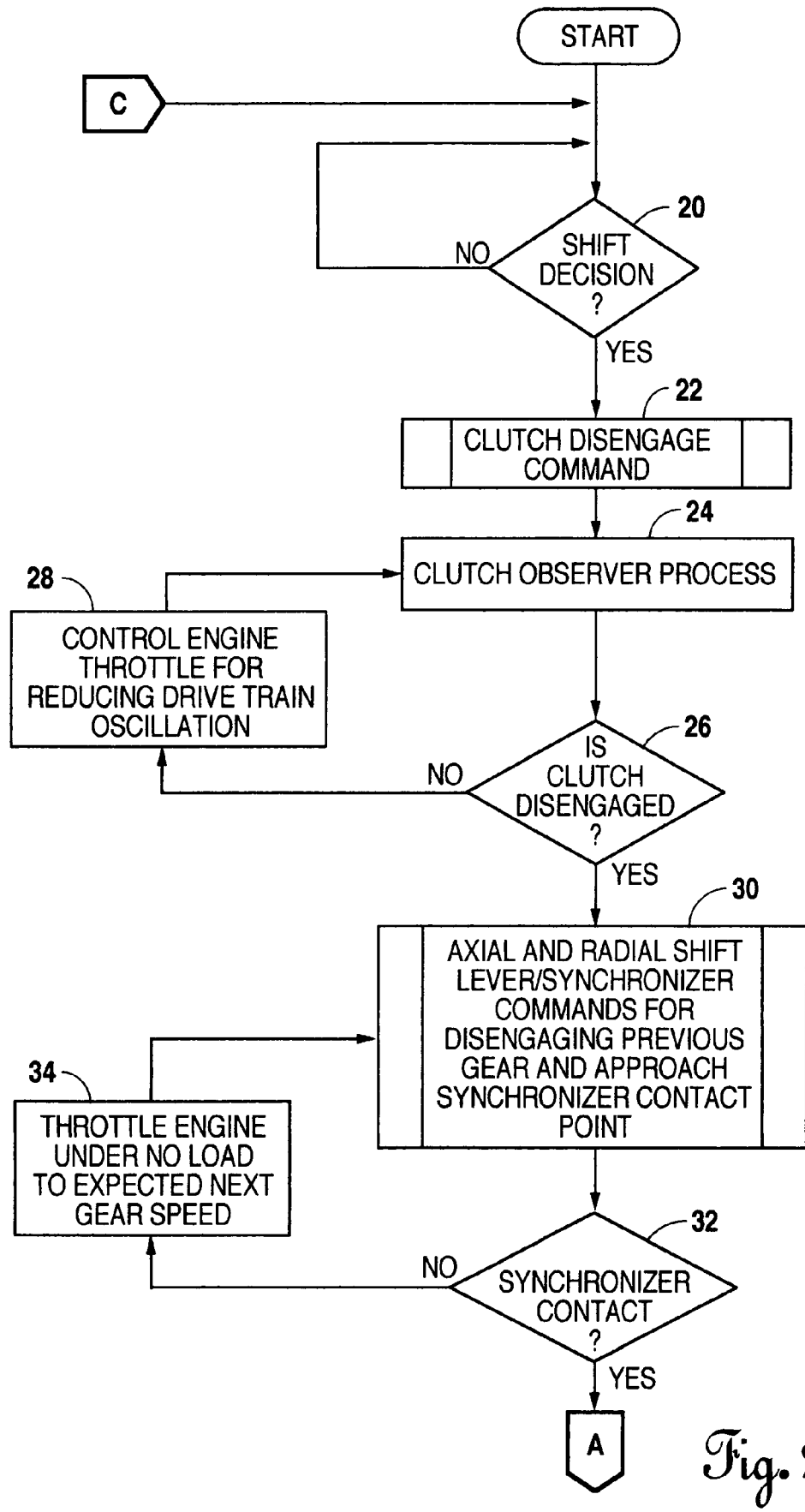
FIGS. 2 and 3 are a flowchart explaining the control strategy for automatically shifting a manual transmission in accordance with the present invention.
Figure 3:
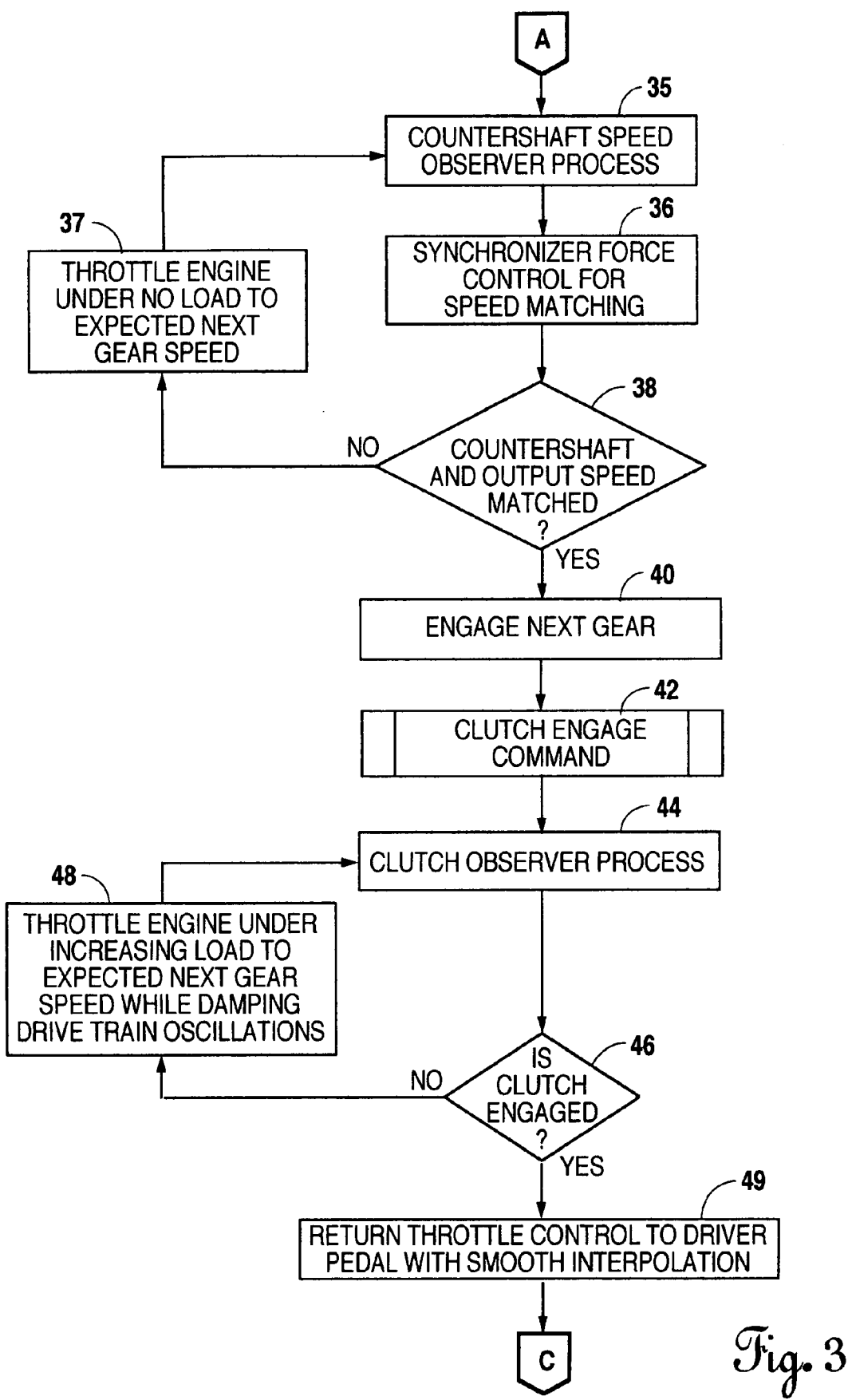

A flowchart explaining the control method for automatically shifting a manual transmission in accordance with the present invention is shown in FIGS. 2 and 3. Upon receipt of a shift decision, as represented at decision block 20 in FIG. 2, the control method embodying the present invention is automatically initiated by a conventional programmable electronic throttle controller (ETCU). The shift decision may be manually provided by a vehicle operator through operation of a gear shift lever or other operator controlled input devices such as a shift paddle mounted on the steering column, or it may be automatically derived from an engine map of engine torque and vehicle speed.

The initial step of the clutch disengage process is a command signal from the ETCU to an actuator for the clutch, as indicated in block 22. Typically, in an automated synchromesh transmission, the clutch actuator is either a linear or rotary actuator acting directly on a shift lever connected to a clutch plate. The actuators are typically hydraulically or electrically powered. The ETCU determines how the signal to the actuator will be tailored for starting the clutch disengagement sequence. The clutch observer process, as represented in block 24, estimates the state of engagement/disengagement of the clutch in accordance with the following algorithm:

$$F_{act}l = k_d x_c + b\dot{x}_c \quad (1)$$

where $F_{act}$ is the clutch actuator force
l is the lever ratio if any
$k_d$ is the diaphragm spring stiffness
$x_c$ is the displacement of the control lever
$\dot{x}_c$ is the derivative of $x_c$
b is the lumped viscous damping in the clutch mechanism From the above mathematical expression, it can be seen that the clutch actuator force $F_{act}$ is directly related to the displacement of the control level $x_c$. Typically, hydraulically or electrically powered actuators provide, or have the inherent ability to provide, a data signal representative of pressure or electric current. In hydraulic systems, the hydraulic pressure acting on the clutch actuator will be directly proportional to the force exerted by the clutch lever the clutch plate. Likewise, in an electrically powered actuator, the current flowing through the electric actuator circuit during movement of the control lever will be proportional to the force applied by the actuator on the clutch plate. Thus, it can be seen that, in accordance with the present invention, the need for hard sensors adapted to measure actual displacement, or position, of the clutch member is avoided. The status of, or degree of, clutch disengagement is monitored throughout the clutch disengagement process and clutch disengagement determined. As set forth in algorithm (1), above, when the clutch is fully disengaged the intrinsic actuator force $F_{act}$ will have a value that is directly correlatable with the displacement of the control lever. It is only during the initial calibration of a particular system that it may be desirable to validate and, if necessary modify, the relationship between the required applied force and actual physical displacement.

Simultaneously with carrying out the clutch disengagement process, which begins with the clutch disengage command and concludes when it is observed that the clutch is disengaged, as described above and indicated at decision block 26, the engine throttle is controlled to reduce drive train oscillations as represented by block 28 of FIG. 2. For example, when the clutch is disengaged during the shift process, and accordingly the engine is disconnected from the drive train, there will typically be an increase in engine speed unless the throttle is controlled to reduce the speed increase. Moreover, the torque characteristics of the transmission greatly influence engine speed, and desirably should be considered in applying control signals to the throttle during the clutch disengagement process. The transmission torque characteristics can be expressed by the following algorithm where:

$$\text{Transmission Torque} = J\omega + Bu \quad (2)$$

where $$J = \begin{bmatrix} \dfrac{(J_m + J_{tl})k}{J_1 n} \\ \dfrac{(J_m + J_{tl})}{J_1}(b_1 + c/n^2) - b_{tl} \\ \dfrac{(J_m + J_{tl})c}{J_1 n} \end{bmatrix}^T , \omega = \begin{bmatrix} \dfrac{\omega_e}{n} - \omega_v \\ \dot{\omega}_e \\ \dot{\omega}_v \end{bmatrix} \text{ and}$$

$$B = 1 - \dfrac{(J_m + J_{tl})}{J_1}$$

where
$J_m$=engine inertia
$J_{t1}$=transmission inertia on input side
$J_1$=engine+transmission+output shaft inertia
$J_2$=wheel and vehicle mass inertia
$J_{t2}$=transmission inertia on output side
$\omega_e, \omega_v$=engine and vehicle speed
$b_1$=viscous damping of engine, transmission and output shaft
$b_{t1}$=viscous damping on input side of transmission
c=torsional damping of output shaft and drive shafts
k=torsional stiffness of output shaft and drive shafts
n=current gear ratio, and
u=engine torque (equivalent to engine map and throttle with lookup)

The clutch disengagement and engine throttle control during the clutch disengagement process is a two-way process. The throttle controller works in tandem with the clutch observer process, so that the rate at which the clutch is disengaged, and drive train oscillation throttle control are carried out simultaneously. For instance, if the clutch is disengaged too quickly, a drastic change in oscillation is likely to occur, whereas if the clutch is disengaged over a finite length of time, for example on the order of about 20–30 ms, the throttle controller will more easily be able to stabilize engine oscillations. Thus, it can be seen throttle control performance is dictated by how the clutch disengage command is shaped.

As noted above, it is highly desirable to consider the transmission torque characteristics during the time that the engine throttle is controlled to reduce drive train oscillations. A finite response time is needed to control drive train oscillations because changes in drive train inertia, damping and friction present a realistic limit on how fast drive train oscillations can be controlled.

The goal of the present invention is to manage the shift process so that the amount of time required for individual events, such as clutch disengagement, reengagement, synchromesh gear shifting, and other individual tasks, as described below, are performed in as minimal amount of time as possible while assuring good shift feel and minimizing wear on drive train components. Moreover, more time is required to dampen engine and drive train oscillations separately, such as by using vehicle speed and engine speed values, than required to carry out the control and event processes concurrently in accordance with the present invention. For example, in accordance with the present invention, the clutch disengagement process and drive train oscillation damping are controlled in parallel, i.e., hand-in-hand, and the time required for the overall shift process is thereby minimized. By taking transmission torque characteristics into consideration when controlling of the engine throttle during the drive train oscillation damping process, the observed values of the respective speed variations are biased by factoring in the inertia, viscous and torsional damping, and torsional stiffness of transmission and drive train components.

After the ETCU observes that the value of the monitored intrinsic parameter associated with clutch actuator-applied force has a value sufficient to indicate that the clutch is disengaged as indicated at decision block 26, the ETCU automatically proceeds into the next phase of the shift process. As indicated at block 30, the ETCU provides commands to move the axial and radial shift forks to respective positions at which a currently engaged gear is disengage from the output shaft and move a synchronizer assembly to a position at which initial contact is made with the selected gear. The actual physical position of the shift fork, and accordingly the synchronizer assembly can be estimated in accordance with the following algorithms, wherein algorithm (3), below, provides an estimation of the axial position of the shift fork or synchronizer and algorithm (4), following, provides an estimate of the radial position of the shift fork.

$$M_{sa}X_s + b_s X_s = F_{axial} \quad (3)$$

where $M_{sa}$ is the mass inertia of the shift fork, synchronizer and actuator in the axial direction $X_s$ is the axial position of the shift fork or synchronizer $b_s$ is the damping constant in the shift fork mechanism in the axial direction $F_{axial}$ is the axial or gear shift actuator force $$M_{sr}\alpha_s + b_{sr}\alpha_s = F_{radial} \quad (4)$$

where $M_{sr}$ is the mass inertia of the shift fork, synchronizer and actuator in the radial direction $\alpha_s$ is the radial position of the shift fork $b_{sr}$ is the damping constant in the radial direction $F_{radial}$ is the radial or gear shift select actuator force As described above with respect to the clutch actuator, the shift fork actuator, or actuators, may be powered either hydraulically or electrically by any one of several known actuator mechanisms. Typically, the shift fork actuator may comprise two separate actuators, one for moving the shift fork in an axial direction as represented in algorithm (3) and a second actuator for moving the shift fork in a radial direction as represented by algorithm (4). The force imposed on the shift fork by the actuators, either hydraulically or electrically driven, can be readily be observed by monitoring the inherent values of the fluid pressure provided to, or the electrical current flow through, the respective actuators.

Throughout gear disengagement and synchronizer approach to a selected gear, the engine is throttled under no load to bring a synchronizing gear mounted on a countershaft, rotationally connected to a transmission input shaft from the engine, to a speed matching that of the selected gear speed, as indicated at block 34. In a like manner as that described above with respect to engine throttle control during the clutch disengagement process, the engine is controlled under no load during the disengagement and synchronizer movement process and modulated to take into account the transmission torque characteristics in accordance with equation (2), above.

After the ETCU observes that the synchronizer is at the initial contact point with the selected gear, based upon the above described observed intrinsic force values as indicated in decision block 32, the countershaft speed which is directly correlatable with engine speed, and the output shaft speed which is directly correlatable with vehicle speed, are observed in a countershaft speed observer process as indicated at block 35 OF FIG. 3. During this process, the observer estimates the speed of the different transmission gears to facilitate quick speed matching by control of the synchromesh actuator as indicated at block 36, in accordance with the following algorithm:

$$J_{gear}\omega_{gear} + b_1 \omega_{gear} = \quad (5)$$
$$0 \text{ when Synchromesh Cone is disengaged}$$
$$\mu F_{synchromesh} \text{ when Synchromesh Cone is engaged}$$

where $J_{gear}$ is the inertia of the gear to be engaged $\omega_{gear}$ is the gear speed to be estimated $b_1$ is the viscous damping in the transmission $\mu$ is the coefficient of contact friction between blue and orange synchronizer cones $F_{synchromesh}$ is the synchromesh actuator force Vehicle and engine speed are typically available on all vehicles. Vehicle speed is generally provided to a speedometer and engine speed is customarily provided by a sensor detecting the rotational speed of a camshaft or crankshaft of the engine.

Synchromesh transmissions use friction to bring gars to the same speed before engagement. More specifically, a cone, or collar, on the synchronizer is moved along the output shaft of the transmission toward the selected gear which is mounted on the output shaft of the transmission. The selected gear rotates at a speed independent of the rotational speed of the output shaft until it is locked to the output shaft by the synchronizer mechanism. Friction occurring between the cone or collar of the synchronizer and the selected gear causes the speed of the selected gear and the output shaft of the transmission to be brought to the same speed, i.e., synchronized.

Once contact occurs, and synchronization is achieved, typically a toothed-ring provided on the synchronizer rotationally fixed to the output shaft, engages dogteeth on the side of the selected gear and the selected gear and output shaft are coupled and rotate together. As indicated by algorithm (5), it can be seen that when the synchromesh cone is disengaged, the product of the inertia of the gear to be engaged and the derivative of the speed of the selected gear to be estimated plus the product of the viscous damping in the transmission and the gear speed to be estimated will equal zero, whereas when the synchromesh cone is engaged with the selected gear, the sum of the two products will be equal to the product of the coefficient of contact friction between the synchronizer cone and the selected gear and the synchromesh actuator force.

The engine is throttled under no load to bring the countershaft speed into synchronization with the selected gear speed, as indicated at block 37. Throughout this process, as described above with respect to engine throttle control during the clutch observer process and engine throttle control under no load during disengagement of the synchronizer from a previous gear and movement of the synchronizer toward the selected gear, the transmission torque characteristics, as represented in equation (2) above, are used to decrease the time required to match the speed of the countershaft and output shaft.

When it is observed that the speed of the selected gear and the output shaft are matched, as indicated at decision block 38, the synchronizer is moved into fixed engagement with the selected gear and the selected gear and output shaft rotate in unison, as described above and indicated at block 40.

After engagement of the selected gear with the output shaft, the transmission controller begins the process of engaging the clutch, as indicated at block 42. In accordance with the present invention, the clutch engagement process is observed as indicated at block 44, and clutch position is estimated based upon the force values provided by the clutch actuator as described above with respect to the clutch disengagement process. During the clutch engagement process, increasing load is imposed on the engine, and in accordance with the present invention, the throttle continues to be controlled during the increasing load condition so that drive train oscillations are simultaneously dampened, as indicated at block 48. Simultaneous damping of drive train oscillations during the clutch engagement process not only enables faster engagement of the engine and drive train, but also reduces wear on clutch plates and other drive train components.

When the observed values associated with clutch actuator force indicate that the clutch is engaged, as indicated at decision block 46, throttle control is returned to the driver as indicated at block 49. It is desirable during the process of returning throttle control to the driver that the engine throttle be controlled dring the transition to provide a smooth interpolation between control of the throttle by the observer-based control method embodying the present invention and control by the driver.

From the above description of the observer-based control method for automatically shifting a manual transmission, it can be seen that the present invention is particularly useful in managing the overall shift process of synchromesh transmissions, using engine torque control and engine speed control to minimize both drive train wind-up and wear. It can also be seen that the present invention provides an observer-based estimation of transition times between engine torque control and speed control without the use of added hard sensors. Moreover, the present invention provides an observer-based estimation of countershaft speed after clutch disengagement. Additionally, mechanical engagement time between the synchromesh gears mounted on the countershaft and the selected gear mounted on the output shaft is reduced by non-linear control of the synchronizer movement during speed matching between the countershaft and output shaft. Another important feature of the present invention is that the state of clutch engagement or disengagement is estimated based on kinematics and dynamics of the actuator mechanism instead of exclusive dependence on relative speed between plates of the clutch assembly.

Although the present invention is described in terms of a preferred illustrative embodiment, those skilled in the art will recognize that the observer-based control method for automatically shifting synchromesh transmissions may be carried out using different inherent values of force exerted by the various actuators. For example, in an electrically powered actuator, the voltage drop across the actuator may be used to estimate the force exerted by the actuator on a particular member. Such applications of the method embodying the present invention are intended to fall within the scope of the following claims. Other aspects, features, and advantages of the present invention may be obtained from a study of this disclosure and the drawings, along with the appended claims.

What I claim is:

1. An observer-based control method for automatically shifting a synchromesh transmission having an input shaft connected to an engine through a disengageable clutch, an output shaft, a plurality of drive gears mounted on the output shaft, a shift fork adapted to move a selected one of a plurality of synchronizers arranged to bring a selected drive gear mounted on the output shaft to a rotational speed substantially equal to that of the output shaft prior to connecting the selected drive gear to the output shaft, a clutch actuator, and a shift fork actuator, said method comprising:

first monitoring an intrinsic operating parameter of said clutch actuator and determining the status of clutch disengagement corresponding to an observed value of said intrinsic operating parameter of the clutch actuator to disengage said disengageable clutch when a shift decision is made;

second monitoring at least one intrinsic operating parameter of said shift fork actuator and determining a spatial position of said shift fork corresponding to an observed value of said at least one intrinsic operating parameter of the shift fork actuator to engage a next gear in said plurality of drive gears upon synchronization; and third monitoring said intrinsic operating parameter of said clutch actuator and determining the status of clutch engagement corresponding to an observed value of said intrinsic operating parameter of the clutch actuator to engage said disengageable clutch for smooth interpolation.

2. The observer-based control method for automatically shifting a synchromesh transmission, as set forth in claim 1, wherein said clutch actuator is a hydraulic actuator and said intrinsic operating parameter of the clutch actuator is fluid pressure acting on a clutch plate force-applying member of the actuator.

3. The observer-based control method for automatically shifting a synchromesh transmission, as set forth in claim 1, wherein said clutch actuator is an electric actuator and said intrinsic operating parameter of the clutch actuator is electrical current flow through the actuator.

4. The observer-based control method for automatically shifting a synchromesh transmission, as set forth in claim 1, wherein said at least one shift fork actuator is a hydraulic actuator and said intrinsic operating parameter of the shift fork actuator is fluid pressure acting on a shift fork force-applying member of the shift fork actuator.

5. The observer-based control method for automatically shifting a synchromesh transmission, as set forth in claim 1, wherein said at least one shift fork actuator is an electrical actuator and said intrinsic operating parameter of the shift fork actuator is electrical current flow through the shift fork actuator during movement of the shift fork by the shift fork actuator.

6. The observer-based control method for automatically shifting a synchromesh transmission, as set forth in claim 1, wherein said method includes simultaneously controlling the throttle of an engine coupled to the input shaft of said synchromesh transmission to dampen engine oscillations during disengagement of the clutch.

7. The observer-based control method for automatically shifting a synchromesh transmission, as set forth in claim 1, wherein said method includes simultaneously controlling the throttle of an engine coupled to the input shaft of said synchromesh transmission to dampen engine oscillations during a shift between drive gears.

8. The observer-based control method for automatically shifting a synchromesh transmission, as set forth in claim 1, wherein said method includes simultaneously controlling the throttle of an engine coupled to the input shaft of said synchromesh transmission to dampen engine oscillations during engagement of the clutch.

9. An observer-based control method for automatically shifting a manual transmission on a vehicle having at least one drive wheel, an engine having a throttle, a synchromesh transmission having an input shaft connected to the engine through a disengageable clutch, an output shaft connected to the at least one drive wheel of the vehicle, a plurality of gears mounted on the output shaft for selective rotation therewith, a shift fork adapted to move one of a plurality of synchronizers adapted to bring a selected gear mounted on the output shaft to a speed matching that of the output prior to connecting the selected gear to the output shaft, a clutch actuator system, a shift fork actuator system, and a programmable transmission controller adapted to receive engine speed, vehicle speed, and gear selection input signals, monitor preselected intrinsic operating parameter of the clutch and shift fork actuator systems, and provide control signals to the engine throttle, the clutch actuator system and the shift fork actuator system, said method comprising:

selecting a desired gear not rotationally connected to the output shaft and delivering a signal to the transmission controller correlative of the selected gear;

providing a clutch disengage command to the clutch actuator system and controllably initiating disengagement of the clutch;

initiating a clutch disengagement process and simultaneously assuming control of the engine throttle to reduce drive train oscillations during the process of disengaging the clutch;

monitoring the clutch disengagement process and determining that said clutch is disengaged when a predefined value of the intrinsic operating parameter of the clutch actuator system is observed;

disconnecting a gear that is rotationally connected to the output shaft from said output shaft;

moving the shift fork into initial contact with a synchronizer associated with the selected gear while simultaneously throttling the engine under no load;

observing a countershaft speed control process in which friction contact between the synchronizer and said selected gear is monitored and the engine throttle is simultaneously controlled to bring the selected gear and the output shaft to the same speed;

moving the synchronizer into rotationally fixed relationship with said selected gear and connecting the selected gear to the output shaft in response to observing that said countershaft and said output shaft are at the same speed;

initiating a clutch engagement process and simultaneously controlling the engine throttle to reduce drive train oscillations during the process of engaging the clutch;

observing clutch engagement; and returning engine throttle control to the vehicle driver in response to observing that said clutch is engaged.

10. The observer-based control method for automatically shifting a manual transmission, as set forth in claim 9, wherein said selecting a desired gear not presently connected to the output shaft and delivering a signal to the transmission controller correlative of the selected gear includes manual selection of the desired gear by a vehicle operator.

11. The observer-based control method for automatically shifting a manual transmission, as set forth in claim 9, wherein said selecting a desired gear not presently connected to the output shaft and delivering a signal to the transmission controller correlative of the selected gear includes observing vehicle speed and load and selecting the desired gear in accordance with predefined shift points based on the observed values of said vehicle speed and load.

12. The observer-based control method for automatically shifting a manual transmission, as set forth in claim 9, wherein said clutch actuator system includes an actuator operated by pressurized fluid, and said initiating a clutch disengagement process and simultaneously assuming control of the engine throttle to reduce drive train oscillations during the process of disengaging the clutch includes observing the pressure of said fluid acting on a clutch plate force-applying member of said actuator during the clutch disengagement process.

13. The observer-based control method for automatically shifting a manual transmission, as set forth in claim 9, wherein said clutch actuator system includes an electrically powered actuator, and said initiating a clutch disengagement process and simultaneously assuming control of the engine throttle to reduce drive train oscillations during the process of disengaging the clutch includes observing the flow of electric current flow through the electrically powered actuator during said clutch disengagement process.

14. The observer-based control method for automatically shifting a manual transmission, as set forth in claim 9, wherein said initiating a clutch disengagement process and simultaneously assuming control of the engine throttle to reduce drive train oscillations during the process of disengaging the clutch includes calculating the contemporaneous affect of changes in transmission torque on said drive train oscillations.

15. The observer-based control method for automatically shifting a manual transmission, as set forth in claim 9, wherein said disconnecting a rotationally connected gear from the output shaft in response to observing that said clutch is disengaged and said moving the shift fork into initial contact with a synchronizer associated with the selected gear while simultaneously throttling the engine under no load includes calculating the contemporaneous affect of changes in transmission torque on said drive train oscillations.

16. The observer-based control method for automatically shifting a manual transmission, as set forth in claim 9, wherein said moving the shift fork into initial contact with a synchronizer associated with the selected gear and said observing a countershaft speed control process in which friction contact between the synchronizer and said selected gear is monitored and the engine throttle is simultaneously controlled to bring the selected gear and the output shaft to the same speed include monitoring at least one intrinsic operating parameter of the shift fork actuator system and determining a spatial position of the shift fork corresponding to an observed value of the intrinsic operating parameter.

17. The observer-based control method for automatically shifting a manual transmission, as set forth in claim 9, wherein said observing a countershaft speed control process in which synchronizer friction contact force is monitored and the engine throttle are simultaneously controlled to bring the selected gear and the output shaft to the same speed includes simultaneously calculating the contemporaneous affect of changes in transmission torque on said drive train oscillations during the countershaft speed control process.

18. The observer-based control method for automatically shifting a manual transmission, as set forth in claim 9, wherein said initiating a clutch engagement process and simultaneously controlling the engine throttle to reduce drive train oscillations during the process of engaging the clutch includes simultaneously calculating the contemporaneous affect of changes in transmission torque on said drive train oscillations during the clutch engagement process.

* * * * *